US012671916B2

(12) United States Patent
Hasuo

(10) Patent No.: US 12,671,916 B2
(45) Date of Patent: Jun. 30, 2026

(54) IMAGE SENSOR AND IMAGE SENSOR MODULE

(71) Applicants: Kabushiki Kaisha Toshiba, Tokyo (JP); Toshiba Electronic Devices & Storage Corporation, Tokyo (JP)

(72) Inventor: Tomotake Hasuo, Yokohama Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 72 days.

(21) Appl. No.: 18/460,919

(22) Filed: Sep. 5, 2023

(65) Prior Publication Data

US 2024/0314264 A1 Sep. 19, 2024

(30) Foreign Application Priority Data

Mar. 14, 2023 (JP) ................................. 2023-039863

(51) Int. Cl.
*H04N 25/766* (2023.01)
*H04N 25/78* (2023.01)

(52) U.S. Cl.
CPC ........... *H04N 25/766* (2023.01); *H04N 25/78* (2023.01)

(58) Field of Classification Search
CPC ............. H04N 1/00822; H04N 1/2369; H04N 25/75; H04N 25/76; H04N 25/766; H04N 25/78
See application file for complete search history.

(56) References Cited

U.S. PATENT DOCUMENTS

| | | | |
|---|---|---|---|
| 7,408,683 B2 | 8/2008 | Sato et al. | |
| 8,593,699 B2 | 11/2013 | Hasuo et al. | |
| 9,363,407 B2 | 6/2016 | Kaihotsu | |
| 2009/0195842 A1 | 8/2009 | Sasaki | |
| 2016/0353972 A1* | 12/2016 | Yano | A61B 1/000094 |
| 2017/0237873 A1 | 8/2017 | Watanabe | |
| 2021/0202549 A1* | 7/2021 | Yoneda | H10F 39/811 |

(Continued)

FOREIGN PATENT DOCUMENTS

| | | |
|---|---|---|
| JP | H11-27112 A | 1/1999 |
| JP | 2001-094785 A | 4/2001 |
| JP | 2004-048549 A | 2/2004 |

(Continued)

OTHER PUBLICATIONS

Japanese Office Action mailed Apr. 17, 2026 in corresponding Japanese Patent Application 2023-039863 with English Translation, 8 pages.

*Primary Examiner* — Daniel M Pasiewicz
(74) *Attorney, Agent, or Firm* — Kim & Stewart LLP

(57) ABSTRACT

An image sensor is provided in a semiconductor chip and includes an image capturing circuit configured to output an image signal representing an image, a plurality of output terminals that are electrically connected to the image capturing circuit, and a switching circuit electrically connected between the image capturing circuit and the plurality of output terminals, the switching circuit being controlled to output the image signal output from the image capturing circuit through one of the output terminals, based on a mode indication signal indicating an output mode of the image sensor.

12 Claims, 5 Drawing Sheets

(56) References Cited

U.S. PATENT DOCUMENTS

2022/0103712 A1    3/2022  Yanagiwara et al.

FOREIGN PATENT DOCUMENTS

| | | |
|---|---|---|
| JP | 2009-188485 A | 8/2009 |
| JP | 2010-268202 A | 11/2010 |
| JP | 2012-070161 A | 4/2012 |
| JP | 2014-131179 A | 7/2014 |
| JP | 2017-147513 A | 8/2017 |
| JP | 2022-056083 A | 4/2022 |

* cited by examiner

*FIG. 2*

| FCS (IMAGE SENSOR D) | Low |
|---|---|
| MIS (IMAGE SENSOR A,B,C) | High |
| MIS (IMAGE SENSOR D,E,F) | High |

| FCS (IMAGE SENSOR D) | High |
|---|---|
| MIS (IMAGE SENSOR A,B,C) | Low |
| MIS (IMAGE SENSOR D,E,F) | Low |

IMAGE SENSOR AND IMAGE SENSOR MODULE

CROSS-REFERENCE TO RELATED APPLICATION(S)

This application is based upon and claims the benefit of priority from Japanese Patent Application No. 2023-039863, filed Mar. 14, 2023, the entire contents of which are incorporated herein by reference.

FIELD

Embodiments of the present disclosure relate to an image sensor and an image sensor module.

BACKGROUND

In fields such as automated optical inspection (AOI) and document scanning, an image sensor module including a plurality of image sensors that output image signals is used. Some of such image sensor modules have a plurality of output channels for outputting image signals, and may change the number of image signals output from the image sensor module, according to the output mode. The output modes include a serial output mode in which image signals from the plurality of image sensors are serially output from one output channel of the image sensor module, and a parallel output mode in which image signals from the plurality of image sensors are output from the plurality of output channels of the image sensor module in parallel.

In such an image sensor module, a plurality of output channels are connected to one output terminal of each image sensor in order to change the number of image signals to be output according to the output mode. Therefore, when the image sensor module operates in a certain output mode, there is redundant wiring that is not used for transmitting image signals, outside each image sensor. As a result, the quality of the image signal may deteriorate due to the influence of noise.

DESCRIPTION OF THE DRAWINGS

FIG. 2 is a diagram showing a schematic configuration of an image sensor according to a modification example.

DETAILED DESCRIPTION

Figure 1:
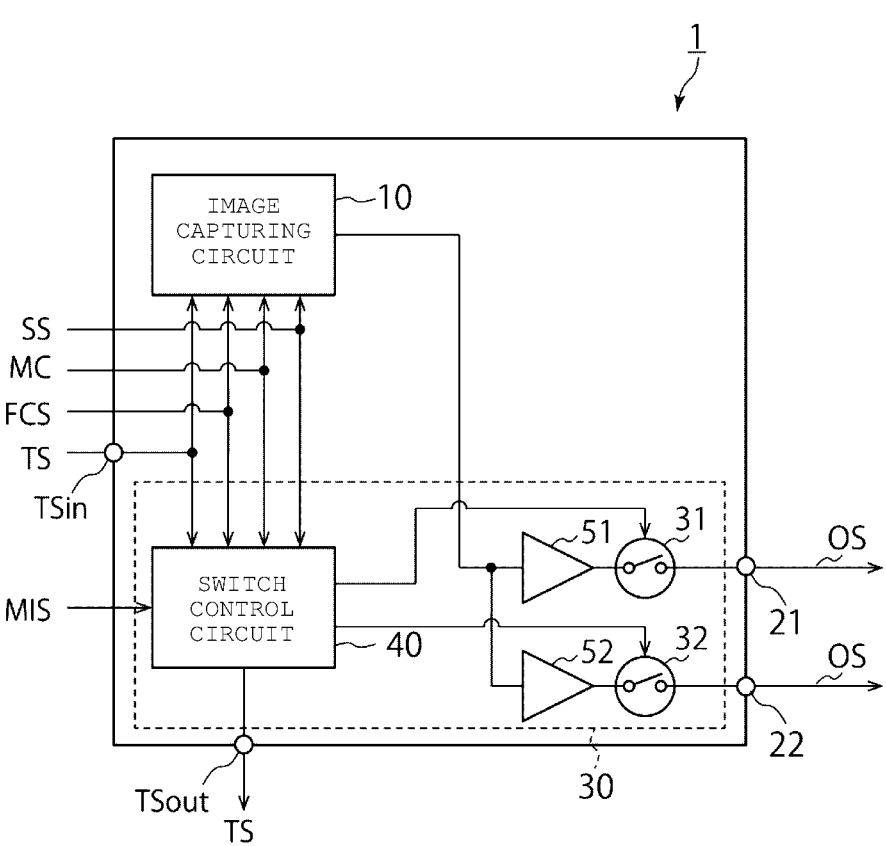
FIG. 1 is a diagram showing a schematic configuration of an image sensor according to an embodiment.

Embodiments provide an image sensor and an image sensor module capable of reducing deterioration of image signals.

In general, according to one embodiment, an image sensor according to the present embodiment is provided in a semiconductor chip, and includes an image capturing circuit configured to output an image signal representing an image, a plurality of output terminals that are electrically connected to the image capturing circuit, and a switching circuit electrically connected between the image capturing circuit and the plurality of output terminals, the switching circuit being controlled to output the image signal output from the image capturing circuit through one of the output terminals, based on a mode indication signal indicating an output mode of the image sensor.

Hereinafter, embodiments of the present disclosure will be described with reference to the drawings. The embodiments do not limit the present disclosure. The drawings are schematic or conceptual, and the ratio of each part is not necessarily the same as the actual one. In this specification and figures, the same elements as those described above with respect to the above-mentioned figures are designated by the same reference numerals, and detailed description thereof will be omitted as appropriate.

Image Sensor

An image sensor 1 according to an embodiment will be described with reference to FIG. 1. FIG. 1 is a diagram showing a schematic configuration of the image sensor 1 according to the present embodiment.

The image sensor 1 is provided in a semiconductor chip. The image sensor 1 is, for example, a linear image sensor (also referred to as a line image sensor) or a contact image sensor (CIS). The image sensor 1 may be a two-dimensional image sensor.

As shown in FIG. 1, the image sensor 1 according to the present embodiment includes an image capturing circuit 10, a plurality of output terminals 21 and 22, and a switching unit 30.

The image capturing circuit 10 captures an image of an object-to-be imaged, and outputs an image signal OS representing the image of the object-to-be imaged. For example, the image capturing circuit 10 has a plurality of photodiodes, performs predetermined conversion on electrical signals output from each photodiode, and outputs an image signal OS based on the electrical signals of the plurality of photodiodes. The image signal OS output by the image capturing circuit 10 is an analog signal. Further, the image signal OS output by the image capturing circuit 10 may be a monochrome image signal or a color image signal.

The output terminals 21 and 22 are terminals for outputting image signals OS, output from the image capturing circuit 10, to the outside of the semiconductor chip on which the image sensor 1 is provided. The output terminal 21 is conductively connected to the image capturing circuit 10 via a semiconductor switch 31 which will be described later. That is, the output terminal 21 is electrically connected to the image capturing circuit 10 when the semiconductor switch 31 is on, and the output terminal 21 is electrically isolated from the image capturing circuit 10 when the semiconductor switch 31 is off. Similarly, the output terminal 22 is conductively connected to the image capturing circuit 10 via a semiconductor switch 32.

When the image signal OS is a color image signal, for example, three output terminals respectively corresponding to red, green, and blue are provided as the output terminal 21, and three output terminals respectively corresponding to red, green, and blue are provided as the output terminal 22.

The switching unit 30 is configured to switch which one of the plurality of output terminals 21 and 22 to output the image signal OS output from the image capturing circuit 10. A detailed configuration of the switching unit 30 will be described later.

As shown in FIG. 1, the switching unit 30 receives a mode indication signal MIS. The mode indication signal MIS is a signal for indicating the output mode of an image sensor module 100, which will be described later with reference to FIG. 3. In the present embodiment, the mode indication signal MIS is a high voltage (High) or low voltage (Low) digital signal. As shown in FIG. 1, in the present embodiment, the mode indication signal MIS is given from the outside of the image sensor 1. The output mode is an operation mode of the image sensor module 100, corresponding to the number of image signals that the image sensor module 100 outputs simultaneously. For example, output modes include a serial output mode and a parallel output mode. The serial output mode is an output mode for serially outputting image signals of a plurality of image sensors 1 from one output channel of the image sensor module 100. The parallel output mode is an output mode for outputting image signals of the plurality of image sensors 1 from a plurality of output channels of the image sensor module 100 in parallel.

The switching unit 30 switches which one of the output terminal 21 and the output terminal 22 to output the image signal OS output from the image capturing circuit 10, based on the mode indication signal MIS input from the outside of the image sensor 1. In the present embodiment, the image sensor 1 outputs the image signal OS from the output terminal 21, when the mode indication signal MIS is at a high voltage (High). In the present embodiment, the image sensor 1 outputs the image signal OS from the output terminal 22, when the mode indication signal MIS is at a low voltage (Low). In the image sensor module 100, when the other image sensor 1 outputs the image signal OS, the switching unit 30 may turn off the output terminals 21 and 22 such that the image signal OS is not output from either of the output terminals 21 and 22.

The switching unit 30 of the present embodiment will be described in more detail below.

As shown in FIG. 1, the switching unit 30 has a plurality of semiconductor switches 31 and 32, a switch control circuit 40, and a plurality of amplifiers 51 and 52.

The semiconductor switches 31 and 32 are controlled to be on or off by the switch control circuit 40. The semiconductor switches 31 and 32 are, for example, bipolar transistors, MOSFETs, or the like. As shown in FIG. 1, the left end of the semiconductor switch 31 is connected to the output of the amplifier 51. The right end of the semiconductor switch 31 is connected to the output terminal 21. Similarly, the left end of the semiconductor switch 32 is connected to the output of the amplifier 52. The right end of the semiconductor switch 32 is connected to the output terminal 22.

The amplifiers 51 and 52 amplify the image signal OS output by the image capturing circuit 10. As shown in FIG. 1, the input of the amplifier 51 is connected to the output of the image capturing circuit 10. Further, the input of the amplifier 52 is connected to the output of the image capturing circuit 10 in parallel with the input of the amplifier 51.

The switch control circuit 40 receives a mode indication signal MIS and turns on one of the plurality of semiconductor switches 31 and 32, based on the received mode indication signal MIS. For example, the switch control circuit 40 respectively changes the gate voltages (or base voltages) of the semiconductor switches 31 and 32, based on the voltage of the mode indication signal MIS. In the present embodiment, when the mode indication signal MIS is at a high voltage (High), the switch control circuit 40 turns on the semiconductor switch 31 and turns off the semiconductor switch 32. Accordingly, the image signal OS is output from the output terminal 21 and not output from the output terminal 22. On the other hand, when the mode indication signal MIS is at a low voltage (Low), the switch control circuit 40 turns on the semiconductor switch 32 and turns off the semiconductor switch 31. Accordingly, the image signal OS is output from the output terminal 22 and not output from the output terminal 21. Such switch control circuit 40 is configured with, for example, a logic circuit. The off state of the semiconductor switch is also called a high impedance state (Hi-Z).

In this manner, one ends of the semiconductor switches 31 and 32 are electrically connected to the output of the image capturing circuit 10, and the other ends of the semiconductor switches 31 and 32 are electrically connected to the correlated output terminal among the plurality of output terminals 21 and 22. Further, the switch control circuit 40 turns on one of the plurality of semiconductor switches 31 and 32, based on the received mode indication signal MIS. Thereby, the switching unit 30 can switch which one of the output terminals 21 and 22 to output the image signal OS output from the image capturing circuit 10, based on the mode indication signal MIS.

The configuration of the switching unit 30 shown in FIG. 1 is an example, and the embodiment is not limited to this. For example, although the semiconductor switch 31 and the amplifier 51 are shown as separate elements in FIG. 1, the semiconductor switch 31 may be provided in the amplifier 51. Similarly, the semiconductor switch 32 may be provided in the amplifier 52.

In FIG. 1, when the image signal OS is a color image signal, for example, the semiconductor switch 31 is provided with three semiconductor switches corresponding to red, green, and blue, respectively, and the amplifier 51 is provided with three amplifiers corresponding to red, green, and blue, respectively. That is, one end of the semiconductor switch corresponding to red among the semiconductor switches 31 is connected to the amplifier corresponding to red among the amplifiers 51, and the other end of the semiconductor switch is connected to the output terminal corresponding to red among the output terminals 21. The same applies to the semiconductor switches corresponding to green and blue among the semiconductor switches 31 and the amplifiers corresponding to green and blue among the amplifiers 51. Further, the same applies to the semiconductor switch 32 and the amplifier 52. With this configuration, even when the image signal OS is a color image signal, the switching unit 30 may switch which one of the plurality of output terminals to output the image signal OS output from the image capturing circuit 10, based on the mode indication signal MIS. For example, the switching unit 30 may switch which one of the output terminal to output the image signal OS corresponding to red, based on the mode indication signal MIS, from among the output terminals 21 and the output terminals 22.

In FIG. 1, the switch control circuit 40, the image capturing circuit 10, and the plurality of semiconductor switches 31 and 32 are provided on the same semiconductor chip, but the switch control circuit 40 may be provided outside the semiconductor chip in which the image sensor 1 is provided. That is, the switching unit 30 may not have the switch control circuit 40.

In the present embodiment, the image capturing circuit 10 and the switch control circuit 40 share an image-capturing control signal that controls the operation of the image capturing circuit 10. In the present embodiment, the image-capturing control signals are a master clock MC, a leading chip determination signal FCS, a synchronization signal SS, and a timing signal TS. The shared image-capturing control signal may be any one or more of these signals.

The master clock MC is a clock signal input from the outside of the image sensor 1. The master clock MC indicates, for example, the operation timing of each photodiode of the image capturing circuit 10.

The leading chip determination signal FCS is a signal for determining whether the image sensor 1 itself is the leading chip or a chip other than the leading chip (hereinafter also referred to as "non-leading chip"). Here, the leading chip is an image sensor that first outputs the image signal OS among the plurality of image sensors 1 of the image sensor module 100, in each output mode of the image sensor module 100, which will be described later. Further, the non-leading chip is an image sensor that outputs the image signal OS from the second and subsequent image sensors among the plurality of image sensors 1, in each output mode of the image sensor module 100. The leading chip determination signal FCS is, for example, a high voltage (High) or low voltage (Low) digital signal. In the present embodiment, the image sensor 1 determines (identifies) itself as a leading chip when the leading chip determination signal FCS is at high voltage (High), and determines itself as a non-leading chip when the leading chip determination signal FCS is at low voltage (Low).

In the present embodiment, the leading chip determination signal FCS is input from outside the image sensor 1. For example, when the image sensor 1 operates both as a leading chip and as a non-leading chip depending on the situation, the leading chip determination signal FCS is input from outside the image sensor 1. When the image sensor 1 always operates as the leading chip or always operates as the non-leading chip, the internal signal of the image sensor 1 may be used as the leading chip determination signal FCS.

The synchronization signal SS is a signal indicating a timing at which the image sensor 1 operating as the leading chip outputs the image signal OS. In the present embodiment, the synchronization signal SS is a horizontal synchronization (H-Sync) pulse, and indicates a timing by using a change in voltage. In FIG. 1, the synchronization signal SS is input from outside the image sensor 1, but the synchronization signal SS may be generated inside the image sensor 1 by the image capturing circuit 10, the switch control circuit 40, or the like by dividing the master clock MC.

The timing signal TS is a signal indicating a timing at which the image sensor 1 operating as the non-leading chip outputs the image signal OS. In the present embodiment, the timing signal TS is a pulse signal and indicates a timing by using a change in voltage. In the example shown in FIG. 1, the timing signal TS is input from the outside of the image sensor 1 to a terminal TSin. Further, the switch control circuit 40 generates a timing signal TS for the next-stage image sensor 1 in the image sensor module 100 and outputs the timing signal TS from the terminal TSout. Instead of the switch control circuit 40, the image capturing circuit 10 may generate a timing signal TS for the next-stage image sensor 1 and output the timing signal TS from the terminal TSout.

Hereinafter, the operation of the image sensor 1 according to the present embodiment will be described separately for the case where the image sensor 1 operates as a leading chip and the case where the image sensor 1 operates as a non-leading chip.

The image sensor 1 operating as the leading chip starts outputting the image signal OS at the timing of the synchronization signal SS. For example, both the semiconductor switches 31 and 32 are turned off in advance, and the switch control circuit 40 turns on one of the semiconductor switches 31 and 32 at the timing of the synchronization signal SS. At this time, which of the semiconductor switches

31 and 32 is to be turned on by the switch control circuit 40 is determined based on the mode indication signal MIS.

After a predetermined time has elapsed since the start of outputting the image signal OS, the image sensor 1 stops outputting the image signal OS and outputs the timing signal TS from the terminal TSout. For example, after a predetermined time has elapsed, the switch control circuit 40 switches the semiconductor switch in the ON state among the semiconductor switches 31 and 32 to the OFF state, and outputs the timing signal TS from the terminal TSout. Here, the "predetermined time" is, for example, the time required to output the image signal OS for one image, and is determined from the number of photodiodes in the image capturing circuit 10 and the frequency of the master clock MC.

The image sensor 1 operating as a non-leading chip starts outputting the image signal OS, when the timing signal TS is input from the preceding image sensor. After a predetermined time has elapsed, the image sensor 1 stops outputting the image signal OS and outputs the timing signal TS from the terminal TSout to the next-stage image sensor. For example, after a predetermined time has elapsed, the switch control circuit 40 switches the semiconductor switch in the ON state among the semiconductor switches 31 and 32 to the OFF state.

In this manner, the image capturing circuit 10 and the switch control circuit 40 share an image-capturing control signal that controls the operation of the image capturing circuit 10. Thereby, the operation of the switch control circuit 40 can be synchronized with the operation of the image capturing circuit 10. For example, the image capturing circuit 10 starts outputting the image signal OS at the timing of the synchronization signal SS or the timing signal TS. Then, the switch control circuit 40 can switch either of the semiconductor switches 31 and 32 to the ON state at the same timing.

As described above, the image sensor 1 according to the present embodiment is an image sensor provided in a semiconductor chip, and includes the switching unit 30 that switches which one of the plurality of output terminals 21 and 22 to output the image signal output from the image capturing circuit 10, based on the mode indication signal MIS for indicating the output mode of the image sensor module 100. Thus, in the image sensor module 100 having the plurality of image sensors 1, one output terminal of the image sensors 1 is not connected to the plurality of output channels, so that there is no wiring (redundant wiring) that is not used for transmitting image signals outside the image sensor 1. Therefore, deterioration of the image signal output from the image sensor module 100 can be reduced.

Modification Example of Image Sensor

Figure 2:
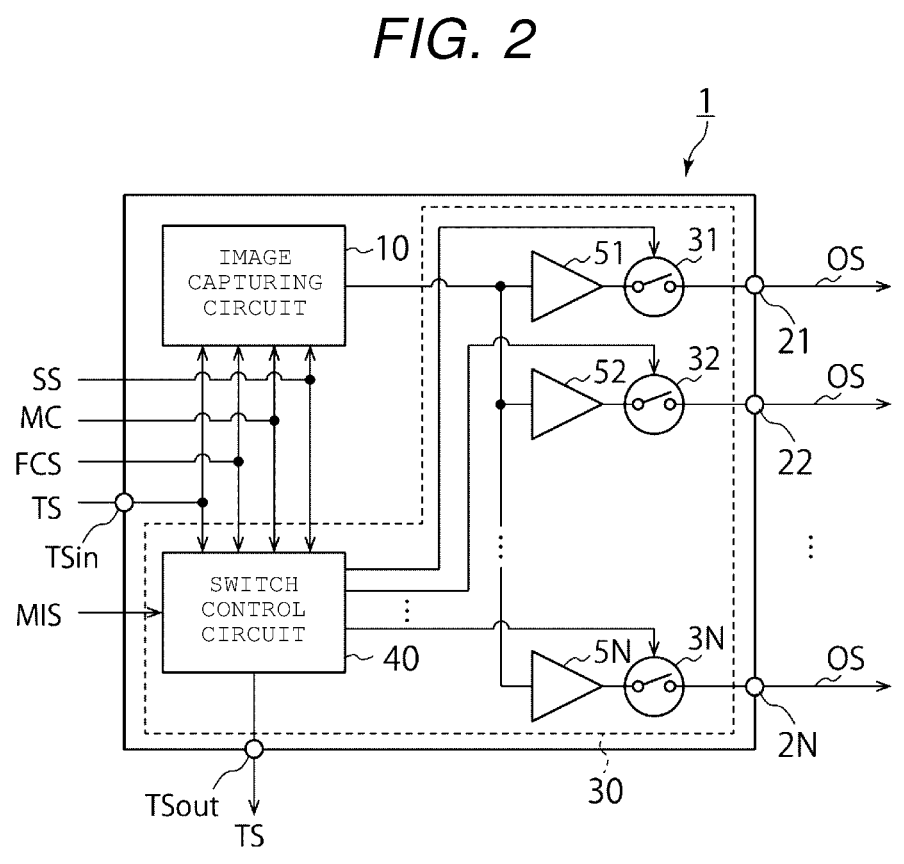

A modification example of the image sensor will be described with reference to FIG. 2. FIG. 2 is a diagram showing a schematic configuration of an image sensor 1 according to the modification example. One of the differences between the present modification example and the above-described embodiment is the number of output terminals. Hereinafter, the differences from the embodiment will be mainly described.

As shown in FIG. 2, the image sensor 1 according to the present modification example has N output terminals 21, 22, . . . , 2N (N is an integer of 2 or more, the same below). The switching unit 30 also includes N semiconductor switches 31, 32, . . . , 3N and N amplifiers 51, 52, . . . , 5N.

One ends (left ends in FIG. 2) of the semiconductor switches 31, 32, . . . , 3N are respectively connected to the outputs of the amplifiers 51, 52, . . . , 5N. The other ends (right ends in FIG. 2) of the semiconductor switches 31, 32, . . . , 3N are respectively connected to the output terminals 21, 22, . . . , 2N. Inputs of the amplifiers 51, 52, . . . , 5N are connected in parallel to the output of the image capturing circuit 10.

The switch control circuit 40 turns on one of the semiconductor switches 31, 32 . . . , 3N, based on the mode indication signal MIS. In the present modification example, the mode indication signal MIS is a digital signal having one of a plurality of voltages respectively corresponding to each output mode, for example. Alternatively, the mode indication signal MIS may be a combination of a plurality of digital signals respectively corresponding to respective output modes.

In this manner, one end of each of the semiconductor switches 31, 32, . . . , 3N is electrically connected to the output of the image capturing circuit 10, and the other end is electrically connected to the corresponding output terminal among the plurality of output terminals 21, 22, . . . , 2N. Accordingly, the image sensor 1 can switch from which one of the output terminals 21, 22, . . . , 2N the image signal OS output from the image capturing circuit 10 is to be output, based on the mode indication signal MIS.

As described above, the image sensor 1 according to the modification example includes a switching unit 30 that switches which one of the N (N is an integer greater than or equal to 2) output terminals 21, 22, . . . , 2N to output the image signal output from the image capturing circuit 10, based on the mode indication signal MIS for indicating the output mode of the image sensor module 100. Thus, in the image sensor module 100 having a plurality of image sensors 1, there is no wiring that is not used for transmitting image signals outside the image sensor 1, thereby reducing the deterioration of the image signal output from the image sensor module 100.

Image Sensor Module

Figure 3:
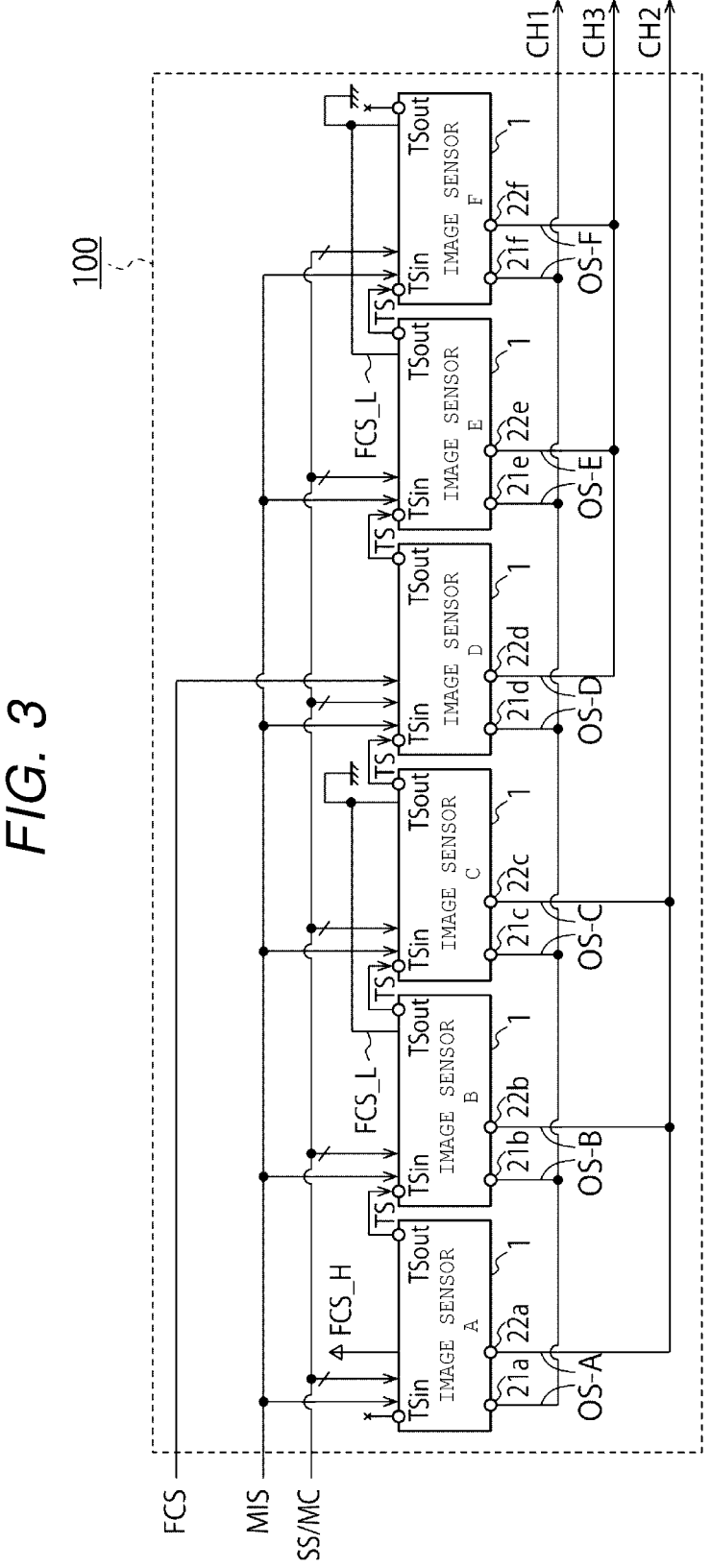
FIG. 3 is a diagram showing a schematic configuration of an image sensor module according to the embodiment.
Figure 4:
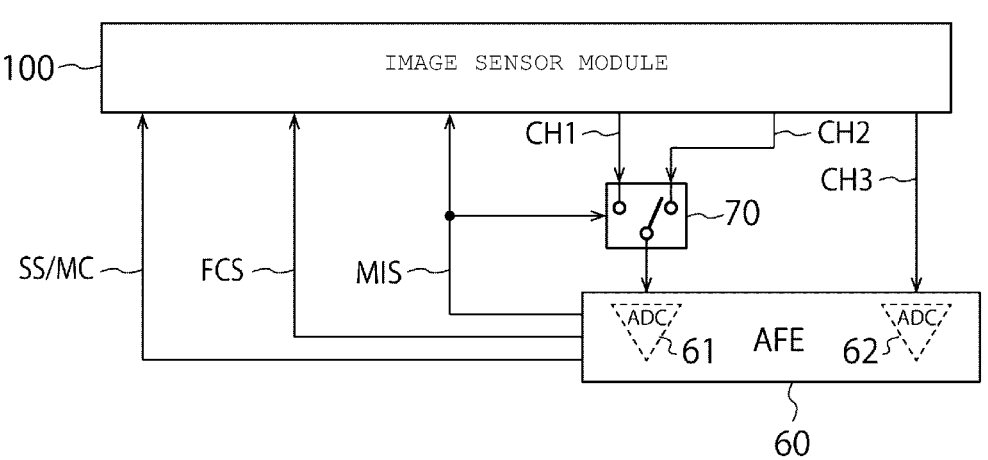
FIG. 4 is a diagram showing a configuration of the image sensor module and an analog front end according to the embodiment.

An image sensor module 100 including the plurality of image sensors 1 described above will be described with reference to FIGS. 3 and 4. FIG. 3 is a diagram showing a schematic configuration of the image sensor module 100 according to the present embodiment. FIG. 4 is a diagram showing a configuration in which an analog front end 60 is connected to the image sensor module 100 according to the present embodiment.

The image sensor module 100 according to the present embodiment includes a plurality of image sensors 1. In the example shown in FIG. 3, the image sensor module 100 includes six image sensors 1 (hereinbelow, the six image sensors 1 are referred to as an image sensor A, an image sensor B, an image sensor C, an image sensor D, an image sensor E, and an image sensor F). In the image sensor module 100 according to the present embodiment, the image sensors A to F are arranged in a line to form a linear image sensor module.

As shown in FIG. 3, the image sensors A to F have output terminals 21a to 21f and output terminals 22a to 22f, respectively. Output terminals 21a to 21f and output terminals 22a to 22f output image signals OS-A to OS-F.

More specifically, the image sensor A has the output terminals 21a and 22a for outputting the image signal OS-A of the image sensor A. The image sensor B has the output terminals 21b and 22b for outputting the image signal OS-B of the image sensor B. The image sensor C has the output terminals 21c and 22c for outputting the image signal OS-C of the image sensor C. The image sensor D has the output terminals 21d and 22d for outputting the image signal OS-D of the image sensor D. The image sensor E has the output terminals 21e and 22e for outputting the image signal OS-E of the image sensor E. The image sensor F has the output terminals 21f and 22f for outputting the image signal OS-F of the image sensor F.

Further, the image sensors A to F belong to a first image sensor group or a second image sensor group. In the present embodiment, the image sensors A, B, and C belong to the first image sensor group, and the image sensors D, E, and F belong to the second image sensor group.

As shown in FIG. 3, the output terminals 21a, 21b, and 21c of the image sensors A, B and C belonging to the first image sensor group and the output terminals 21d. 21e, and 21f of the image sensors D. E and F belonging to the second image sensor group are connected to each other to form an output channel CH1.

Further, as shown in FIG. 3, the output terminals 22a, 22b, and 22c of the image sensors A, B, and C belonging to the first image sensor group are connected to each other to form an output channel CH2.

Further, as shown in FIG. 3, the output terminals 22d, 22e, and 22f of the image sensors D, E, and F belonging to the second image sensor group are connected to each other to form an output channel CH3.

As shown in FIG. 4, output channels CH1, CH2 and CH3 of the image sensor module 100 are connected to the analog front end (AFE) 60. Specifically, the output channels CH1 and CH2 are connected to the analog front end 60 via a switch 70, and the output channel CH3 is connected directly to the analog front end 60.

The analog front end 60 has analog/digital conversion circuits (A/D converters) 61 and 62 that convert analog image signals OS-A to OS-F into digital signals. In the present embodiment, the output channel CH1 and the output channel CH2 are connected to the A/D converter 61 via the switch 70, and the output channel CH3 is connected to the A/D converter 62.

The switch 70 is controlled by the mode indication signal MIS, and electrically connects the A/D converter 61 and the output channel CH1 or the output channel CH2. As will be described later, in the present embodiment, when the mode indication signal MIS is at a high voltage (High), the switch 70 connects the A/D converter 61 and the output channel CH1, and when the mode indication signal MIS is at a low voltage (Low), the switch 70 connects the A/D converter 61 and the output channel CH2.

As shown in FIG. 4, in the present embodiment, the analog front end 60 outputs the mode indication signal MIS, the leading chip determination signal FCS, the synchronization signal SS, and the master clock MC to the image sensor module 100. The leading chip determination signal FCS output from the analog front end 60 is input only to the image sensor D, as shown in FIG. 3.

Further, as shown in FIG. 3, the mode indication signal MIS is input to the image sensors A to F. In the present embodiment, the mode indication signal MIS is a high voltage (High) or low voltage (Low) digital signal.

In the present embodiment, when the mode indication signal MIS is at a high voltage (High), the image sensors A to F output the image signals OS-A to OS-F from the output terminals 21a to 21f, respectively. That is, when the mode indication signal MIS is at a high voltage (High), the image sensor A outputs the image signal OS-A from the output terminal 21a, the image sensor B outputs the image signal OS-B from the output terminal 21b, the image sensor C outputs the image signal OS-C from the output terminal 21*c*, the image sensor D outputs the image signal OS-D from the output terminal 21*d*, the image sensor E outputs the image signal OS-E from the output terminal 21*e*, and the image sensor F outputs the image signal OS-F from the output terminal 21*f*.

Further, when the mode indication signal MIS is at a low voltage (Low), the image sensors A to F output the image signals OS-A to OS-F from the output terminals 22*a* to 22*f*, respectively. That is, when the mode indication signal MIS is at a low voltage (Low), the image sensor A outputs the image signal OS-A from the output terminal 22*a*, the image sensor B outputs the image signal OS-B from the output terminal 22*b*, the image sensor C outputs the image signal OS-C from the output terminal 22*c*, the image sensor D outputs the image signal OS-D from the output terminal 22*d*, the image sensor E outputs the image signal OS-E from the output terminal 22*e*, and the image sensor F outputs the image signal OS-F from the output terminal 22*f*.

Further, as shown in FIG. 3, common synchronization signal SS and master clock MC are input to the image sensors A to F.

The leading chip determination signal FCS and the timing signal TS are input to the image sensors A to F in different manners. Each of the image sensors A to F will be described below.

As shown in FIG. 3, the image sensor A receives a high-voltage (High) leading chip determination signal FCS_H as the leading chip determination signal FCS. Thus, the image sensor A operates as the leading chip and outputs the image signal OS-A according to the timing of the synchronization signal SS. Further, the timing signal TS is not input to the image sensor A. In the present embodiment, as shown in FIG. 3, the terminal TSin of the image sensor A is an open end. The image sensor A outputs the timing signal TS to the image sensor B from the terminal TSout.

As shown in FIG. 3, the image sensor B receives a low-voltage (Low) leading chip determination signal FCS_L as the leading chip determination signal FCS. Further, the timing signal TS output from the image sensor A is input to the image sensor B from the terminal TSin. Thus, the image sensor B operates as a non-leading chip and outputs the image signal OS-B according to the timing of the timing signal TS. The image sensor B outputs the timing signal TS to the image sensor C from the terminal TSout.

The image sensor C is similar to the image sensor B. That is, as shown in FIG. 3, the image sensor C receives a low-voltage (Low) leading chip determination signal FCS_L as the leading chip determination signal FCS. Further, the timing signal TS output from the image sensor B is input to the image sensor C from the terminal TSin. Thus, the image sensor C operates as a non-leading chip and outputs the image signal OS-C according to the timing of the timing signal TS. The image sensor C outputs the timing signal TS to the image sensor D from the terminal TSout.

As shown in FIG. 3, the image sensor D receives the leading chip determination signal FCS from outside the image sensor module 100. This is because the image sensor D may operate as a leading chip or as a non-leading chip depending on the output mode. That is, when the output mode is the serial output mode, the image sensor D operates as a non-leading chip, and when the output mode is the parallel output mode, the image sensor D operates as a leading chip. Further, the timing signal TS output from the image sensor C is input to the image sensor D from the terminal TSin.

When operating as the leading chip, the image sensor D outputs the image signal OS-D according to the timing of the synchronization signal SS. In this case, the image sensor D ignores the timing signal TS. On the other hand, when operating as a non-leading chip, the image sensor D outputs the image signal OS-D according to the timing signal TS received from the image sensor C. The image sensor D outputs the timing signal TS from the terminal TSout to the image sensor E, when operating as the leading chip or when operating as the non-leading chip.

As shown in FIG. 3, the image sensor E receives a low-voltage (Low) leading chip determination signal FCS_L as the leading chip determination signal FCS. Further, the timing signal TS output from the image sensor D is input to the image sensor E from the terminal TSin. Thus, the image sensor E operates as a non-leading chip and outputs the image signal OS-E according to the timing signal TS. The image sensor E outputs the timing signal TS to the image sensor F from the terminal TSout.

As shown in FIG. 3, the image sensor F receives a low-voltage (Low) leading chip determination signal FCS_L as the leading chip determination signal FCS. Further, the timing signal TS output from the image sensor E is input to the image sensor F from the terminal TSin. Thus, the image sensor F operates as a non-leading chip and outputs the image signal OS-F according to the timing signal TS. The image sensor F outputs the timing signal TS from the terminal TSout, but in the present embodiment, the terminal TSout of the image sensor F is an open end, so that the timing signal TS output from the image sensor F is not input to any image sensor.

The high-voltage (High) leading chip determination signal FCS_H and the low-voltage (Low) leading chip determination signal FCS_L may be internal signals of each image sensor or internal signals of the image sensor module 100. Alternatively, the high-voltage (High) leading chip determination signal FCS_H and the low-voltage (Low) leading chip determination signal FCS_L may be input from outside the image sensor module 100.

As shown in FIG. 3, in the image sensor module 100 according to the present embodiment, the synchronization signal SS is also input to the image sensors B, C, E, and F operating as non-leading chips. In this case, the image sensors B, C, E, and F operating as non-leading chips are configured to ignore the synchronization signal SS. For example, the switch control circuit 40 has a logic gate for receiving the leading chip determination signal FCS and the synchronization signal SS. This logic gate outputs a low voltage (Low) regardless of the voltage of the synchronization signal SS, when the leading chip determination signal FCS is at a low voltage (Low). The image sensors B, C, E, and F operating as non-leading chips are configured to use the output of the logic gate as a synchronization signal.

Further, as shown in FIG. 3, in the image sensor module 100 according to the present embodiment, the timing signal TS is also input to the image sensor D operating as the leading chip. In this case, the image sensor D operating as the leading chip is configured to ignore the timing signal TS. For example, the switch control circuit 40 has a logic gate for receiving the leading chip determination signal FCS and the timing signal TS. The logic gate outputs a low voltage (Low) regardless of the voltage of the timing signal TS, when the leading chip determination signal FCS is at a high voltage (High). The image sensor D operating as the leading chip uses the output of the logic gate as a timing signal.

Thus, the image sensor D operating as the leading chip ignores the timing signal TS, and the image sensors B, C, E, and F operating as non-leading chips ignore the synchronization signal SS. Thereby, the same image sensors 1 may be used as the image sensors A to F, and the design cost of the image sensor module 100 can be reduced.

Next, the operation of the image sensor module 100 according to the present embodiment will be described for each output mode with reference to FIGS. 5A and 5B. In the present embodiment, the output mode of the image sensor module 100 is either serial output mode or parallel output mode.

Serial Output Mode

Figure 5A:
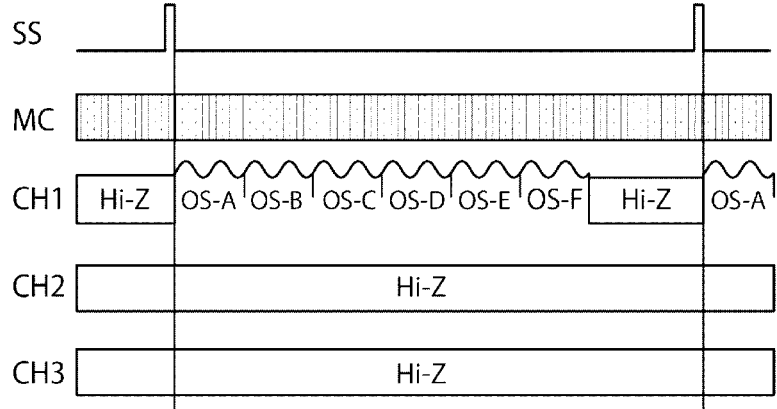
FIG. 5A is a timing chart in a serial output mode of the image sensor module according to the embodiment.

FIG. 5A is a timing chart in a serial output mode of the image sensor module 100 according to the present embodiment. When the mode indication signal MIS indicates the serial output mode, the image sensor module 100 is in the serial output mode. In the present embodiment, in the serial output mode, the mode indication signal MIS input to the image sensors A, B, and C and the mode indication signal MIS input to the image sensors D, E, and F are all high voltage (High).

Further, in the serial output mode, the leading chip determination signal FCS input to the image sensor D is at a low voltage (Low). Therefore, the image sensor D does not function as a leading chip (that is, functions as a non-leading chip), and starts outputting the image signal OS-D at the timing of the timing signal TS.

Since the mode indication signals MIS input to the image sensors A to F are all at a high voltage (High), the image sensors A to F output the image signal OS-A to OS-F to the output terminals 21a to 21f shown in FIG. 3. That is, the image signals OS-A to OS-F are output in serial from the output channel CH1.

In the serial output mode, the switch 70 shown in FIG. 4 connects the output channel CH1 and the A/D converter 61. Thus, the image signals OS-A to OS-F serially output from the output channel CH1 are input to the A/D converter 61. In the serial output mode, the A/D converter 62 is not used and may be stopped.

The operation of each image sensor in the serial output mode will be described below.

First, as shown in FIG. 5A, the image sensor A, which is the leading chip, starts outputting the image signal OS-A from the output terminal 21a upon receiving the synchronization signal SS. The image signal OS-A output from the image sensor A is output from the output channel CH1. After outputting the image signal OS-A, the image sensor A outputs the timing signal TS to the next-stage image sensor B.

Next, when the image sensor B, which is the non-leading chip, receives the timing signal TS from the image sensor A, the image sensor B starts outputting the image signal OS-B from the output terminal 21b. The image signal OS-B output from the image sensor B is output from the output channel CH1. After outputting the image signal OS-B, the image sensor B outputs the timing signal TS to the next-stage image sensor C.

Next, when the image sensor C, which is a non-leading chip, receives the timing signal TS from the image sensor B, the image sensor C starts outputting the image signal OS-C from the output terminal 21c. The image signal OS-C output from the image sensor C is output from the output channel CH1. After outputting the image signal OS-C, the image sensor C outputs the timing signal TS to the next-stage image sensor D.

Next, when the image sensor D, which is a non-leading chip, receives the timing signal TS from the image sensor C, the image sensor D starts outputting the image signal OS-D from the output terminal 21d. The image signal OS-D output from the image sensor D is output from the output channel CH1. After outputting the image signal OS-D, the image sensor D outputs the timing signal TS to the next-stage image sensor E.

Next, when the image sensor E, which is a non-leading chip, receives the timing signal TS from the image sensor D, the image sensor E starts outputting the image signal OS-E from the output terminal 21e. The image signal OS-E output from the image sensor E is output from the output channel CH1. After outputting the image signal OS-E, the image sensor E outputs the timing signal TS to the next-stage image sensor F.

Next, when the image sensor F, which is a non-leading chip, receives the timing signal TS from the image sensor E, the image sensor F starts outputting the image signal OS-F from the output terminal 21f. The image signal OS-F output from the image sensor F is output from the output channel CH1. After that, the image sensor F stops outputting the image signal OS-F.

When the output of the image signal OS-F is completed, the semiconductor switches 31a to 31f of the image sensors A to F go all into a turned off state, and the output channel CH1 is in a high impedance state (Hi-Z).

After that, the synchronization signal SS is input to the image sensor A again, and the above-described process is repeated.

In the serial output mode, both output channels CH2 and CH3 are in Hi-Z.

In this manner, in the serial output mode, the image sensor module 100 outputs the image signals OS-A, OS-B, and OS-C of the image sensors A, B, and C belonging to the first image sensor group and the image signals OS-D. OS-E, and OS-F of the image sensors D, E, and F belonging to the second image sensor group in serial, from the output channel CH1. That is, the image sensor module 100 outputs the image signals OS-A, OS-B, OS-C, OS-D, OS-E, and OS-F of the image sensors A, B, C, D, E, and F in this order from the output channel CH1.

Parallel Output Mode

Figure 5B:
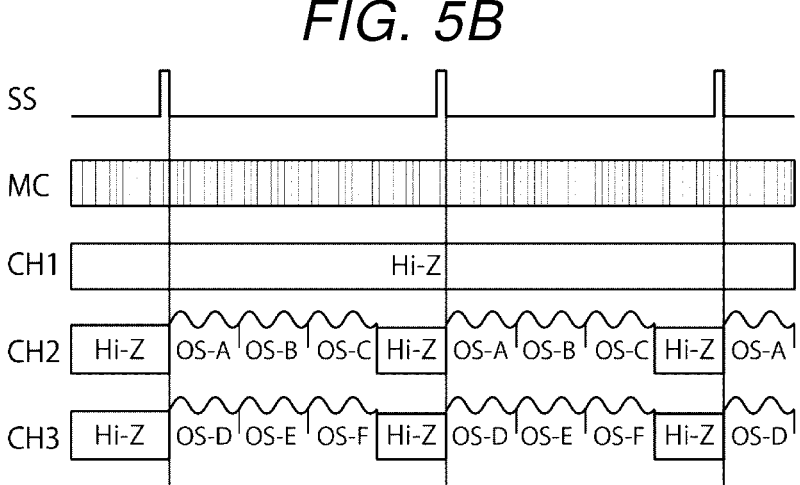
FIG. 5B is a timing chart in a parallel output mode of the image sensor module according to the embodiment.

FIG. 5B is a timing chart in a parallel output mode of the image sensor module 100 according to the embodiment. When the mode indication signal MIS indicates the parallel output mode, the image sensor module 100 is in the parallel output mode. In the present embodiment, in the parallel output mode, the mode indication signal MIS input to the image sensors A, B, and C and the mode indication signal MIS input to the image sensors D, E, and F are all low voltage (Low).

Further, in the parallel output mode, the leading chip determination signal FCS input to the image sensor D is at a high voltage (High). That is, the image sensor D located most upstream of the second image sensor group functions as the leading chip. When receiving the synchronization signal SS, the image sensor D starts outputting the image signal OS-D.

Further, since the mode indication signal MIS input to the image sensors A to F is all at a low voltage (Low), the image sensors A to F output the image signal OS-A to OS-F from the output terminals 22a to 22f shown in FIG. 3. That is, the image signals OS-A to OS-C are output from the output channel CH2, and the image signals OS-D to OS-F are output from the output channel CH3.

In the parallel output mode, the switch 70 shown in FIG. 4 connects the output channel CH2 and the A/D converter 61, and does not connect the output channel CH1 and the A/D converter 61.

The operation of each image sensor in the parallel output mode will be described below.

First, as shown in FIG. 5B, a pulse-like synchronization signal SS is input to the image sensors A and D at the same time. The image sensor A, which is the leading chip, starts outputting the image signal OS-A from the output terminal 22a upon receiving the synchronization signal SS. The image signal OS-A output from the image sensor A is output from the output channel CH2. After outputting the image signal OS-A, the image sensor A outputs the timing signal TS to the next-stage image sensor B. On the other hand, when the image sensor D, which is the leading chip, receives the synchronization signal SS, the image sensor D starts outputting the image signal OS-D from the output terminal 22d. The image signal OS-D output from the image sensor D is output from the output channel CH3. After outputting the image signal OS-D, the image sensor D outputs the timing signal TS to the next-stage image sensor E.

Next, when the image sensor B, which is the non-leading chip, receives the timing signal TS from the image sensor A, the image sensor B starts outputting the image signal OS-B from the output terminal 22b. The image signal OS-B output from the image sensor B is output from the output channel CH2. After outputting the image signal OS-B, the image sensor B outputs the timing signal TS to the next-stage image sensor C. On the other hand, when the image sensor E, which is a non-leading chip, receives the timing signal TS from the image sensor D, the image sensor E starts outputting the image signal OS-E from the output terminal 22e. The image signal OS-E output from the image sensor E is output from the output channel CH3. After outputting the image signal OS-E, the image sensor E outputs the timing signal TS to the next-stage image sensor F.

Next, when the image sensor C, which is a non-leading chip, receives the timing signal TS from the image sensor B, the image sensor C starts outputting the image signal OS-C from the output terminal 22c. The image signal OS-C output from the image sensor C is output from the output channel CH2. After that, the image sensor C stops outputting the image signal OS-C. On the other hand, when the image sensor F, which is a non-leading chip, receives the timing signal TS from the image sensor E, the image sensor F starts outputting the image signal OS-F from the output terminal 22f. The image signal OS-F output from the image sensor F is output from the output channel CH3. After that, the image sensor F stops outputting the image signal OS-F.

Although the image sensor C outputs the timing signal TS to the image sensor D after stopping the output of the image signal OS-C, the image sensor D ignores the timing signal TS, as described above.

When the output of the image signal OS-C is completed, the semiconductor switches 32a to 32c of the image sensors A to C go all into a turned off state, and the output channel CH2 is in Hi-Z. Further, when the output of the image signal OS-F is completed, the semiconductor switches 32d to 32f of the image sensors D to F go all into a turned off state, and the output channel CH3 is in Hi-Z.

After that, the synchronization signal SS is input to the image sensor A and the image sensor D again, and the above process is repeated.

In the parallel output mode, the output channel CH1 is in Hi-Z.

In this manner, in the parallel output mode, the image sensor module 100 outputs the image signals OS-A, OS-B, and OS-C of the image sensors A, B, and C belonging to the first image sensor group and image signals OS-D. OS-E, and OS-F of the image sensors D, E, and F belonging to the second image sensor group, in parallel, from the output channel CH2 and the output channel CH3. That is, the image sensor module 100 outputs the image signals OS-A, OS-B, and OS-C of the image sensors A, B, and C in this order from the output channel CH2, and in parallel, outputs the image signals OS-D, OS-E, and OS-F of the image sensors D, E, and F in this order from the output channel CH3.

As shown in FIGS. 5A and 5B, in the parallel output mode, image signals can be output at a higher speed than in the serial output mode.

As described above, when the mode indication signal MIS indicates the serial output mode, the image sensor module 100 according to the embodiment outputs the image signals OS-A to OS-F of the image sensors A to F in serial, and when the mode indication signal MIS indicates the parallel output mode, the image sensor module 100 outputs the image signals of at least two of the image sensors A to F in parallel. Thereby, the image sensor module 100 can change the number of image signals to be output simultaneously, according to the mode indication signal MIS.

Further, according to the image sensor module 100 according to the present embodiment, since it is possible to switch the output terminal from which each image sensor 1 outputs the image signal OS, there is no redundant wiring between the image sensor module 100 and the analog front end 60. That is, in any output mode, all wirings connected to the analog front end 60 are used to transmit signals. That is, there is no wiring that does not transmit a signal and has an open end or is in a Hi-Z. Thereby, deterioration of the quality of the image signal OS can be reduced.

Further, according to the image sensor module 100 according to the present embodiment, since an A/D converter for each image sensor is provided and the digital signal output from each A/D converter is processed, the number of A/D converters can be reduced, and a separate parallel-serial conversion circuit is not required, as compared to the method of changing the number of image signals output simultaneously by the image sensor module. Further, in the serial output mode, the A/D converter 62 can also be stopped. Therefore, the power consumption of the entire system including the image sensor module 100 can be reduced.

The parallel output mode is not limited to the case where the image signals from two image sensors are output in parallel. For example, in the parallel output mode, the outputs of three or more image sensors 1 may be output in parallel. In this case, each image sensor 1 may have three or more output terminals. Further, the serial output mode is not limited to the case where the image signals of all the image sensors 1 in the image sensor module 100 are serially output. For example, in the serial output mode, only image signals from the image sensors A to C may be output, and image signals from the image sensors D to F may not be output.

Further, although the image sensor module 100 according to the present embodiment includes six image sensors 1, the number of image sensors 1 is not limited to this, and the image sensor module 100 may have any number of image sensors 1.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An image sensor provided in a semiconductor chip, comprising:

an image capturing circuit configured to output an image signal representing an image according to a timing signal that has been selected, based on an external control signal, from a first timing signal and a second timing signal;

a plurality of output terminals that are electrically connected to the image capturing circuit;

a switching circuit electrically connected between the image capturing circuit and the plurality of output terminals, the switching circuit being controlled to output the image signal output from the image capturing circuit through one of the output terminals, based on a mode indication signal indicating an output mode of the image sensor, wherein the switching circuit has a plurality of semiconductor switches, each of which has one end electrically connected to the image capturing circuit and the other end electrically connected to a corresponding one of the output terminals; and a switch control circuit configured to control the plurality of semiconductor switches to be on or off, based on the mode indication signal, wherein the image capturing circuit and the switch control circuit share one or more external control signals for controlling the image capturing circuit, and the external control signals include a master clock, a leading chip determination signal, and the first and second timing signals.

2. The image sensor according to claim 1, wherein the plurality of semiconductor switches include a first semiconductor switch and a second semiconductor switch, and when the mode indication signal is at a first level, the first semiconductor switch is turned on and the second semiconductor switch is turned off, and when the mode indication signal is at a second level, the first semiconductor switch is turned off and the second semiconductor switch is turned on.

3. An image sensor module comprising a plurality of image sensors, wherein each of the image sensors is an image sensor according to claim 1.

4. The image sensor module according to claim 3, wherein when the mode indication signal indicates a serial output mode, image signals of the image sensors are output in series, and when the mode indication signal indicates a parallel output mode, image signals of at least two image sensors among the image sensors are output in parallel.

5. The image sensor module according to claim 4, wherein the output terminals of each of the image sensors include a first output terminal and a second output terminal, and each of the image sensors is assigned to a first image sensor group or a second image sensor group, and the first output terminals of the image sensors of the first and second image sensor groups are connected to each other to form a first output channel, and the second output terminals of the first image sensor group are connected to each other and the second output terminals of the second image sensor group are connected to each other to form second and third output channels, respectively.

6. The image sensor module according to claim 5, wherein when the mode indication signal indicates the serial output mode, the image signals of the image sensors of the first and second image sensor groups are output in series to the first output channel.

7. The image sensor module according to claim 5, wherein when the mode indication signal indicates the parallel output mode, the image signals of the image sensors of the first image sensor group and the image signals of the image sensors of the second image sensor group are respectively output to the second and third output channels in parallel.

8. The image sensor module according to claim 5, wherein the first to third output channels are connected to an analog front end having an A/D converter configured to convert the image signal into a digital signal.

9. The image sensor module according to claim 3, wherein the output terminals are connected to an analog front end having an A/D converter configured to convert the image signal into a digital signal, and the analog front end is configured to supply the mode indication signal, the master clock, the leading chip determination signal, and the first timing signal to the image sensor module.

10. A method of outputting image signals from a plurality of image sensors, each of which is an image sensor according to claim 1, said method comprising:

controlling the image capturing circuit to output the image signal according to the selected timing signal; and controlling the switching circuit to output the image signal output from the image capturing circuit through one of the output terminals, based on the mode indication signal.

11. The method according to claim 10, wherein when the mode indication signal indicates the serial output mode, the image signals of all of the image sensors are output in series to a common output channel.

12. The method according to claim 10, wherein when the mode indication signal indicates the parallel output mode, the image signals of a first group of the image sensors and the image signals of a second group of the image sensors are respectively output to first and second output channels in parallel.

* * * * *